Sept. 6, 1966 L. M. VALLESE 3,271,528

ADJUSTABLE INPUT IMPEDANCE AMPLIFIER

Filed Feb. 7, 1963

INVENTOR.
LUCIO M. VALLESE

BY Alfred C. Hill

AGENT

United States Patent Office 3,271,528

Patented Sept. 6, 1966

3,271,528

ADJUSTABLE INPUT IMPEDANCE AMPLIFIER

Lucio M. Vallese, Glen Ridge, N.J., assignor to International Telephone and Telegraph Corporation, Nutley, N.J., a corporation of Maryland Filed Feb. 7, 1963, Ser. No. 256,918

16 Claims. (Cl. 179—170)

This invention relates to amplifiers and more particularly to an adjustable input impedance amplifier finding utility generally in communication systems and more specifically as a repeater for telephone communication lines.

Repeaters for telephone communication lines presently are generally based either on the use of hybrid transformers or on the use of negative resistance elements. The first type consists of two unidirectional amplifiers, one in the east-west direction and the other one in the west-east direction, interconnected by means of appropriate hybrid transformers. Signals coming from the east side appear only at the terminals of the east-west amplifier and are balanced out at the terminals of the west-east amplifier. A similar situation occurs with the signals coming from the west side. The second type of repeater consists of a negative resistance network which is placed in series, in shunt, or in series-shunt combination with the transmission line, to compensate for the line attenuation. For example, if the telephone line is represented by means of a T structure of resistances, compensation may be obtained by connecting in series with the line a T structure of appropriate negative resistances.

Generally, amplifiers are characterized by a finite power gain and by finite, non-zero values of the input and output impedances. However, if the input impedance is either zero or infinite, the input power is zero and the power gain is infinite.

An object of the present invention is to provide an amplifier whose input impedance may be adjusted to have zero impedance to eliminate power dissipation in the input impedance or a predetermined negative impedance to compensate for attenuation of the line to which the amplifier is coupled while maintaining gain in the amplifier to provide an amplified output signal at the output of the amplifier.

Another object of the present invention is to provide an amplifier capable of being utilized as a repeater for telephone communication lines having both amplification and negative impedance input to compensate for attenuation in the telephone line.

Still another object of the present invention is to provide an amplifier providing zero input impedance or a predetermined negative input impedance and an amplified output signal under either of these conditions with the input and output of the amplifier being interchangeable, that is, the output of the amplifier may be utilized as the input and the input of the amplifier may be utilized as the output.

A feature of this invention is the provision of an amplifier comprising an active element coupled to the amplifier input, a first means coupled to the output of the amplifier and the active element to provide positive feedback to the active element and a second means included in the first means to control the amount of the feedback to adjust the input impedance of the amplifier between two values including zero impedance and a predetermined negative impedance, while maintaining an amplified output signal at the output of the amplifier.

Another feature of this invention is the provision of two transducers in the form of transistors, the first transistor having the input signal coupled to the emitter electrode and the second transistor having its base electrode coupled to the collector electrode of the first transistor with the output signal being coupled from the emitter of the second transistor and a feedback path from the collector of the second transistor to the base of the first transistor to provide positive feedback and a means coupled to this feedback to adjust the amount of the positive feedback to control the value of the input impedance of the amplifier between two values including zero impedance and a predetermined negative impedance while maintaining the amplified output signal at the output of the amplifier. The above-described amplifier circuit is rendered interchangeable as far as the input and output terminals are concerned by incorporating a means in the collector circuit of the first transistor to adjust the amount of positive feedback to the second transistor when the output terminal is employed as the input to the amplifier and the input terminal is employed as the output terminal of the amplifier.

Other features of this invention include the utilization of complementary transistors in place of the transistors of the same conductivity type enabling the reduction in the number of components employed in the amplifier circuit. In addition, a PNPN or NPNP four-zone transistor can be appropriately coupled to circuit components to provide an amplifier circuit providing the adjustable input impedance and amplification in the amplifier circuit.

The above-mentioned and other features and objects of this invention will become more apparent by reference to the following description taken in conjunction with the accompanying drawings, in which.

Figures 1, 2, 3, 4, 5:
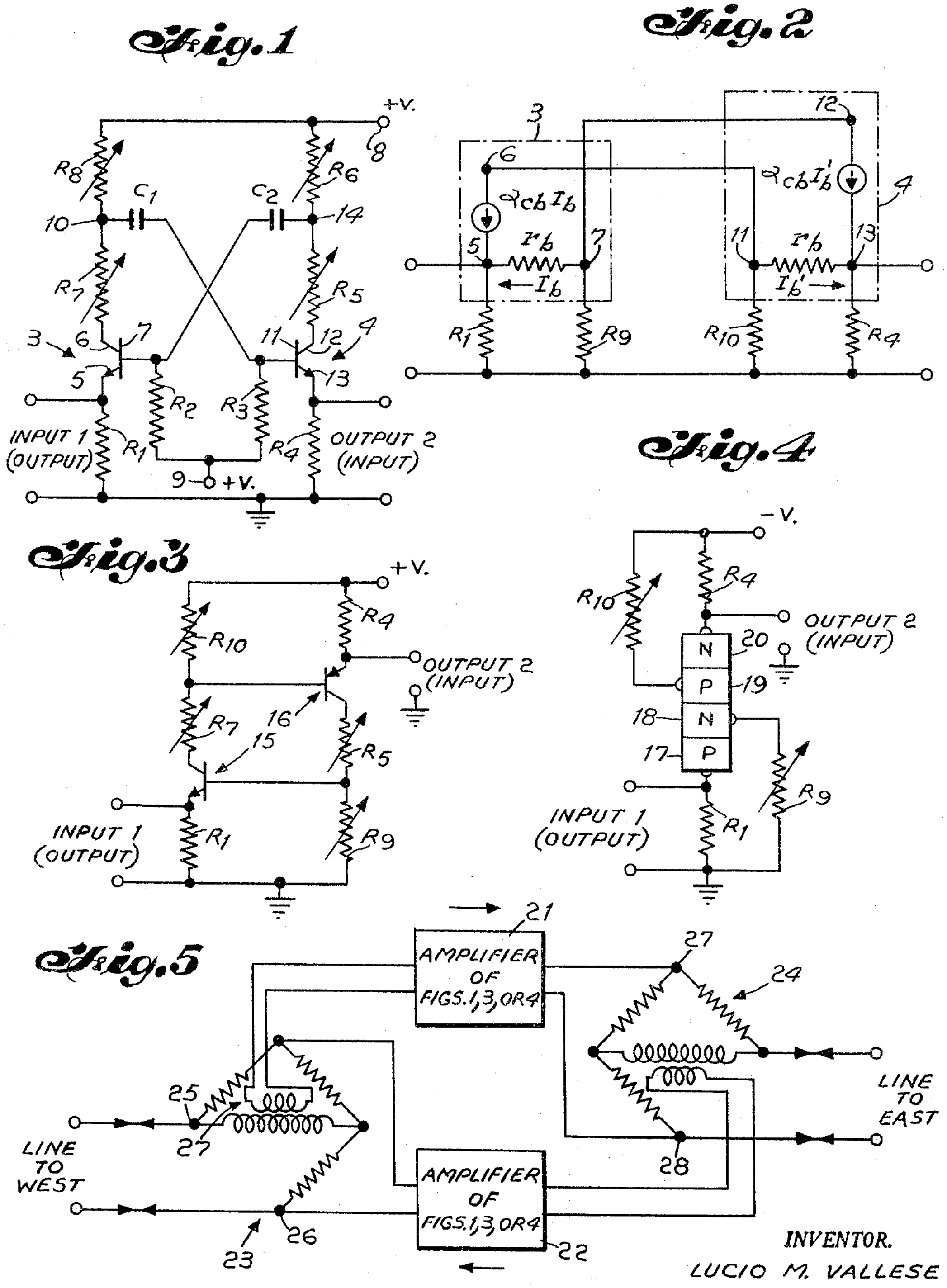
FIG. 1 is a schematic diagram of one embodiment of the amplifier of this invention.
FIG. 2 is a simplified equivalent circuit diagram of the amplifier circuit of FIG. 1.
FIG. 3 is a schematic diagram of another embodiment of the amplifier of this invention.
FIG. 4 is a schematic diagram of still another embodiment of the amplifier of this invention.
FIG. 5 is a schematic diagram partially in block form illustrating the utilization of the amplifiers of FIGS. 1, 3 or 4 in a repeater for a telephone communication line.

Referring to FIG. 1, the amplifier according to the principles of this invention is illustrated as including an input 1, an output 2, an active element in the form of transistor 3, a means including transistor 4 and the capacitor $C_2$ coupled between the first active element and the output 2 to provide positive feedback to the first active element and a means including resistor $R_6$ to control the amount of positive feedback to adjust the input impedance seen by the signal coupled to input 1 of the amplifier between two values including zero impedance and a predetermined negative impedance while still providing an amplified output signal at output 2.

More specifically, the amplifier shown in FIG. 1 includes a transistor 3 having emitter 5 coupled to input resistor $R_1$, collector 6 coupled through resistors $R_7$ and $R_8$ to voltage supply terminal 8 and base 7 connected through resistor $R_2$ to voltage supply terminal 9. As illustrated the voltages at terminals 8 and 9 have the same value, namely, +V. Junction 10 between resistors $R_7$ and $R_8$ is coupled to base 11 of transistor 4 by means of condenser $C_1$ with base 11 being coupled to voltage supply terminal 9 by resistor $R_3$. Collector 12 is coupled by means of resistors $R_5$ and $R_6$ to voltage supply terminal 8 and emitter 13 is connected to resistor $R_4$, the output resistor of the amplifier. Junction 14 between resistors $R_5$ and $R_6$ is coupled by means of condenser $C_2$ to base 7 of transistor 3.

In operation, transistors 3 and 4 are in a normally conductive state. When a positive input signal is applied to input 1, a positive voltage is developed across resistor $R_1$. This reduces the conduction of and, hence, the current flow in transistor 3 and raises the potential at point 10 due to a decrease in voltage drop across resistor $R_8$. The coupling condenser $C_1$ applies this positive voltage increase to base 11 of transistor 4, causing base 11 to become more positive. With base 11 becoming more positive there is an increase in the current flow in transistor 4 since transistor 4 is rendered more conductive. This increase in current flow is reflected in an increase in voltage across resistor $R_4$, thereby applying the input signal to output 2 in an amplified state for application to succeeding circuitry. Due to this increased current flow of transistor 4, point 14 decreases in potential due to an increased voltage drop in resistor $R_6$. Coupling condenser $C_2$ applies this potential decrease to base 7 of transistor 3 acting to further reduce the current flow in transistor 3. The voltage coupled from point 14 to base 7 is in phase with the source voltage, that is, it has the same effect on transistor 3 as does the input signal applied to input 1, namely, reduction in the amount of current flowing in transistor 3. It is possible by varying the value of resistors $R_6$ and $R_5$ to provide a net voltage at input 1 of zero. In this condition, the input impedance and the input power are both zero. However, the output resistance is greater than zero and the output power is finite and, hence, effectively provides an amplified output thereby providing the amplifier with a power gain.

To render the amplifier symmetrical and, hence, bi-directional, the voltage coupled from point 10 to base 11 of transistor 4 is adjusted by means of resistors $R_8$ and $R_7$ so that the impedance at the terminals of output 2 is zero when these are used as input terminals and input 1 is utilized as the output terminal.

Thus, the amplifier of this invention and the specific embodiment illustrated in FIG. 1 has gained between the input and output terminals and is symmetrical insofar as the functions of the input and output terminals may be interchanged. As pointed out hereinabove, this result is obtained by means of the use of feedback between the collector circuit of one transistor to the base electrode of the other transistor. Without this feedback the amplifier actually is adjusted to have a gain of one or slightly less than one in either direction. When the feedback is inserted there is provided zero input impedance at the input terminals and as a result the input power becomes zero and the amplifier exhibits a power gain.

It is, of course, possible to adjust or over-compensate the amount of feedback so that the impedance at the input becomes negative while the output impedance remains positive. In these conditions a higher gain is obtained at the expense of greater sensitivity to variations of the circuit parameters.

To provide a further understanding of the operation of the amplifier of this invention, as exemplified in the circuit of FIG. 1, there is provided in FIG. 2 a simplified equivalent circuit diagram of the circuit of FIG. 1 to permit the derivation of equations demonstrating the operation of the amplifier of FIG. 1, the control thereof, and the design equations for the circuit of FIG. 1.

The equivalent circuit of FIG. 2 utilizes a simplified equivalent circuit for transistors 3 and 4. This equivalent circuit is based on the assumption that $V_c$ is much less than $V_e$ and, furthermore that $V_e$ is small in comparison to $V_b$.

$$R_9=\frac{R_2R_6}{R_2+R_6} \qquad R_{10}=\frac{R_3R_8}{R_3+R_8} \tag{1}$$

$\alpha_{cb}$=common emitter current amplification factor and $r_b$=base resistance of the transistors.

Employing network analysis the voltage at base 11 is as follows:

$$I_b'r_b+I_b'R_4+I_b'R_{10}+\alpha_{cb}I_b'R_4=-I_b\alpha_{cb}R_{10}$$

$$I_b'(r_b+R_4+R_{10}+\alpha_{cb}R_4)=-I_b\alpha_{cb}R_{10}$$

$$[R_4(1+\alpha_{cb})+r_b+R_{10}]I_b'=-I_b\alpha_{cb}R_{10}$$

$$I_b'=-\frac{I_b\alpha_{cb}R_{10}}{R_4(1+\alpha_{cb})+r_bR_{10}} \tag{2}$$

The input voltage is $$V_{in}=-I_br_b-I_bR_9-I_b'\alpha_{cb}R_9$$
$$=-(r_b+R_9)I_b-I_b'\alpha_{cb}R_9$$

and substituting the value of $I_b'$ from Equation 2

$$V_{in}=-(r_b+R_9)I_b+\frac{I_b\alpha_{cb}^2R_{10}R_9}{R_4(1+\alpha_{cb})+r_b+R_{10}}$$
$$=-I_b\left[r_b+R_9-\frac{\alpha_{cb}^2R_{10}R_9}{R_4(1+\alpha_{cb})+r_b+R_{10}}\right] \tag{3}$$

The input impedance is $$Z_{in}=\frac{-V_{in}}{I_b(\alpha_{cb}+1)}$$

and from Equation 3 we obtain $$Z_{in}=\frac{1}{\alpha_{cb}+1}\left[r_b+R_9-\frac{\alpha_{cb}^2R_{10}R_9}{R_4(1+\alpha_{cb})+r_b+R_{10}}\right] \tag{4}$$

The current gain is $$A_i=\frac{I_b'}{I_b}$$

and from Equation 2 we obtain $$A_i=-\frac{\alpha_{cb}R_{10}}{R_4(1\alpha_{cb})+r_b+R_{10}} \tag{5}$$

For $Z_{in}=0$ the following necessary condition is obtained from Equation 4:

$$r_b+R_9=\frac{\alpha_{cb}^2R_{10}R_9}{R_4(1+\alpha_{cb})+r_b+R_{10}} \tag{6}$$

From this equation, it can be seen that by the proper selection of resistors $R_9$ and $R_{10}$, the input impedance can be made equal to zero.

If the amplifier is made symmetrical, then $$R_9=R_{10} \text{ and } Z_{in}=Z_{out}=0 \tag{7}$$

From Equation 5 one obtains the value of $R_{10}$ for a given $A_i$, that is, $$R_{10}=\frac{A_i[R_4(1\alpha_{cb})+r_b]}{(\alpha_{cb}-A_i)} \tag{8}$$

Furthermore, from Equation 6, letting $R_9=R_{10}$, one obtains:

$$R_9^2(\alpha_{cb}^2-1)-R_9[R_4(\alpha_{cb}+1)+2r_b]-r_b[R_4(\alpha_{cb}+1)+r_b]=0 \tag{9}$$

Hence $$R_9=\frac{R_4(\alpha_{cb}+1)+2r_b}{2(\alpha_{cb}^2-1)}+\sqrt{\left[\frac{R_4(\alpha_{cb}+1)+2r_b}{2(\alpha_{cb}^2-1)}\right]^2+r_b\frac{[R_4(\alpha_{cb}+1)+r_b]}{(\alpha_{cb}^2-1)}} \tag{10}$$

Comparison of Equations 8 and 10 illustrates that if $R_4$ is a positive resistance, the current gain $A_i$ must be less than one. It should be recalled, however, the input impedance is equal to zero and the amplifier dissipates no power in the input circuit. Moreover, positive power is obtained as an output even though the current gain may be less than one resulting in a power gain.

On the other hand, if the amplifier is not symmetrical, that is $R_9\neq R_{10}$, one can readily find suitable values of $R_9$ and $R_{10}$ for which the input impedance is zero and the current gain is larger than one, that is, $$1<A_i<\alpha_{cb}$$

The design equations are as follows:

From Equation 8

$$R_{10}=\frac{A_i}{(\alpha_{cb}-A_i)}[R_4(\alpha_{cb}+1)+r_b] \tag{11}$$

From Equation 6

$$R_9=\frac{r_b[R_4(\alpha_{cb}+1)+r_b+R_{10}}{R_{10}(\alpha_{cb}^2-1)-r_b-R_4(\alpha_{cb}+1)} \tag{12}$$

Equations 11 and 12 can be solved for given values of $R_4$ while maintaining the input impedance at zero with the only necessary condition that $A_1<\alpha_{cb}$. It should be noted that if $A_1>1$ and $R_4>0$, $R_{10}>R_9$.

The amplifier of FIG. 1 has been reduced to practice as a repeater connected in series in a thousand ohm transmission line and the following list represents the values of the various components of the circuit of FIG. 1.

$R_1$=1,000 ohms
$R_2$=220,000 ohms
$R_3$=220,000 ohms
$R_4$=1,000 ohms
$R_5$=3,400 ohms
$R_6$=1,600 ohms
$R_7$=4,750 ohms
$R_8$=250 ohms
$C_1$=8 microfarads
$C_2$=8 microfarads
Transistors 3 and 4=2N33
$+V$=6 volts, 0.85 milliampere With these components in the application described, the amplifier gain was two to one in voltage and four to one in power in either direction (6 db power gain). The maximum signal output was found to be 125 millivolts corresponding to a power of $15.5\times10^{-6}$ watts. While these values and results do not represent optimum design results, this reduction to practice indicated that the amplifier operated in the manner hereinabove described and is also indicative of a practical example.

Referring to FIG. 3, there is illustrated another embodiment of the amplifier of this invention employing complementary transistors 15 and 16. The design equations and the method of operation of the amplifier circuit of FIG. 3 are substantially identical to that set forth hereinabove in the description of the circuit of FIG. 1. The circuit of FIG. 3 enables the elimination of the coupling capacitors $C_1$ and $C_2$ of FIG. 1.

Referring to FIG. 4, still another embodiment of the amplifier of this invention is schematically illustrated employing a PNPN (or NPNP) transistor. The operation of the four-zone transistor of FIG. 4 can be best understood by comparing the various zones with the functions of the various electrodes of transistors 15 and 16 of FIG. 3. Zone 17 essentially behaves as the emitter of transistor 15 and zone 18 essentially behaves as the base of transistor 15. Zone 18 also essentially behaves as the collector of transistor 16. Zone 19 has the same function as the collector of transistor 15 and the base of transistor 16 while zone 20 performs substantially the same function as the emitter of transistor 16. With this comparison, the operation of FIG. 4 is substantially the same as that of FIG. 3 and the conditions for the desired mode of operation are obtained by adjusting resistors 9 and 10.

Referring to FIG. 5, there is illustrated schematically a transmission line repeater utilizing the adjustable input impedance amplifier of this invention. The repeater of FIG. 5 incorporates two amplifiers in accordance with the principles of this invention having the configuration of either FIG. 1, 3 or 4. Amplifier 21 is the west-to-east amplifier while amplifier 22 is the east-to-west amplifier of the repeater. The circuitry of amplifiers 21 and 22 is designed to have zero input impedance and a current gain larger than one.

Amplifiers 21 and 22 are coupled to the transmission line by balanced bridges 23 and 24. Signals applied to bridge 23 at terminals 25 and 26 cause a current to flow through the primary of transformer 27, thereby inducing the input signal into the secondary of transformer 27 for application to the input of amplifier 21. Amplifier 21 having zero input impedance passes the signal to terminals 27 and 28 of bridge 24 for application to the line communicating with the east. The signal at the output of amplifier 21 has an amplified level compared with the signal at its input with no power dissipation in the input circuit of amplifier 21. Due to the balanced nature of bridge 23 the input signal at terminals 25 and 26 are not applied to amplifier 22 and due to the balanced nature of bridge 24 the output signal of amplifier 21 is not coupled to the input of amplifier 22.

Application of signal from the east is in the same manner applied to the input of amplifier 22 and, hence, to the line going to the west.

To summarize, the amplifier in accordance with the principles of this invention includes a combination of two amplifier stages which are arranged in such a way that the input and the output are interchangeable, that is, the input can be used as the output and the output can be used as the input. The two amplifier stages appear as a cascade combination of a common base, common collector amplifier. The gain of the combination is adjusted so that the input impedance is zero or negative. When the input impedance is zero the input power to the amplifier is zero and the output power is larger than zero. As a result, if the amplifier is connected in series with a transmission line, the circuit is equivalent to the insertion of a source proportional to the line current as well as a small positive resistance which is equal to the output resistance of the amplifier. If the gain of the amplifier is adjusted so that the input impedance is negative, the amplifier inserts a source, a positive resistance and a negative resistance in the line. The negative resistance may be made large enough to compensate not only for the losses produced by the output resistance of the amplifier but also the losses produced by the line resistances or attenuation. As a result, the overall gain of the amplifier is equal to the product of the gain of the amplifier itself produced by the inserted source and the reciprocal of the loss of the transmission line.

Ordinary negative resistance repeaters employed in this situation will only compensate for the losses of the line and, therefore, will give an overall power gain which is less than one since some residual losses are unavoidable in general. The present amplifier employed as a repeater on the contrary not only compensates for the line losses, but in addition introduces a gain which is due to the fact that the repeater acts as an amplifier, not simply as a negative resistance unit.

While I have described above the principles of my invention in connection with specific apparatus, it is to be clearly understood that this description is made only by way of example and not as a limitation to the scope of my invention as set forth in the objects thereof and in the accompanying claims.

I claim:

1. An amplifier comprising:
an input;
an output;
a first active element coupled to said input circuit;
a second active element coupled between the output of said first active element and said output;
first means coupling said second active element to said first active element to provide positive feedback for said first active element; and
second means coupled to said first means to control the amount of said feedback to adjust the input impedance of said amplifier between two values including zero impedance and a predetermined negative impedance while maintaining an amplified output signal at said output.

2. An amplifier according to claim 1, wherein said input impedance is adjusted to zero.

3. An amplifier according to claim 1, wherein said input impedance is adjusted to a negative impedance to compensate for attenuation of the signal applied to said amplifier.

4. An amplifier according to claim 1, further including a third means coupled to the output of said first active element to control the amount of signal coupled from said first active element to said second active element to render said input and said output interchangeable.

5. An amplifier according to claim 1, wherein said first active element is a first transistor and said second active element is a second transistor.

6. An amplifier according to claim 5, wherein said first means includes a circuit coupled between the collector electrode of said second transistor and the base electrode of said first transistor.

7. An amplifier according to claim 6, wherein said first and second transistors are of the same type.

8. An amplifier according to claim 6, wherein said first and second transistors are complementary transistors.

9. An amplifier according to claim 1, wherein said first active element includes the first three zones of a four-zone transistor and said second active element includes the last three zones of said four-zone transistor.

10. An amplifier according to claim 9, wherein said four-zone transistor is a PNPN transistor.

11. An amplifier according to claim 9, wherein said second means includes a variable resistor coupled from the second zone of said four-zone transistor to a reference potential.

12. An amplifier comprising:
- a first transistor having a base, emitter and collector;
- a first resistor coupled between the emitter of said first transistor and a reference potential;
- a second resistor coupled between the base of said first transistor and a first voltage supply;
- third and fourth resistors coupled in series between the collector of said first transistor and a second voltage supply;
- a first signal terminal coupled to the emitter of said first transistor;
- a second transistor having a base, emitter and collector;
- a fifth resistor coupled between the base of said second transistor and said first voltage supply;
- a sixth resistor coupled between the emitter of said second transistor and said reference potential;
- a second signal terminal coupled to the emitter of said second transistor;
- seventh and eighth resistors coupled in series between the collector of said second transistor and said second voltage supply;
- a first condenser coupled between the junction of said third and fourth resistors and the base of said second transistor; and
- a second condenser coupled between the junction of said seventh and eighth resistors and the base of said first transistor.

13. An amplifier according to claim 12, wherein the values of said seventh and eighth resistors are adjusted to control the input impedance of said amplifier between two values including zero impedance and a predetermined negative impedance when said first signal terminal constitutes the input to said amplifier and an amplified output signal appears at said second signal terminal.

14. An amplifier according to claim 12, wherein the values of said third and fourth resistors are adjusted to control the input impedance of said amplifier between two values including zero impedance and a predetermined negative impedance when said second signal terminal constitutes the input to said amplifier and an amplified output signal appears at said first signal terminal.

15. An amplifier comprising:
- a first transistor of a given type having a base, emitter and collector;
- a first resistor coupled between the emitter of said first transistor and a reference potential;
- second and third resistors coupled in series between the collector of said first transistor and a voltage supply;
- a first signal terminal coupled to the emitter of said first transistor;
- a second transistor of a type complementary to said given type having a base, emitter and collector;
- a fourth resistor coupled between the emitter of said second transistor and said voltage supply;
- fifth and sixth resistors coupled in series between the collector of said second transistor and said reference potential;
- a second signal terminal coupled to the emitter of said second transistor;
- a conductor connecting the base of said first transistor to the junction of said fifth and sixth resistors; and
- a conductor connecting the base of said second transistor to the junction of said second and third resistors.

16. An amplifier comprising:
- a transistor having four-zones disposed in tandem, adjacent ones of said zones being different conductivity types;
- a first resistor coupled between the first of said zones and a reference potential;
- a first signal terminal coupled to said first of said zones;
- a second resistor coupled between the second of said zones and said reference material;
- a third resistor coupled between the fourth of said zones and a voltage source;
- a fourth resistor coupled between the third of said zones and said voltage source; and
- a second signal terminal coupled to said fourth of said zones.

References Cited by the Examiner

UNITED STATES PATENTS 2,585,078 2/1952 Barney ------------ 330—26 X

KATHLEEN H. CLAFFY, *Primary Examiner.*

ROBERT H. ROSE, *Examiner.*

H. ZELLER, *Assistant Examiner.*